UNITED STATES PATENT OFFICE.

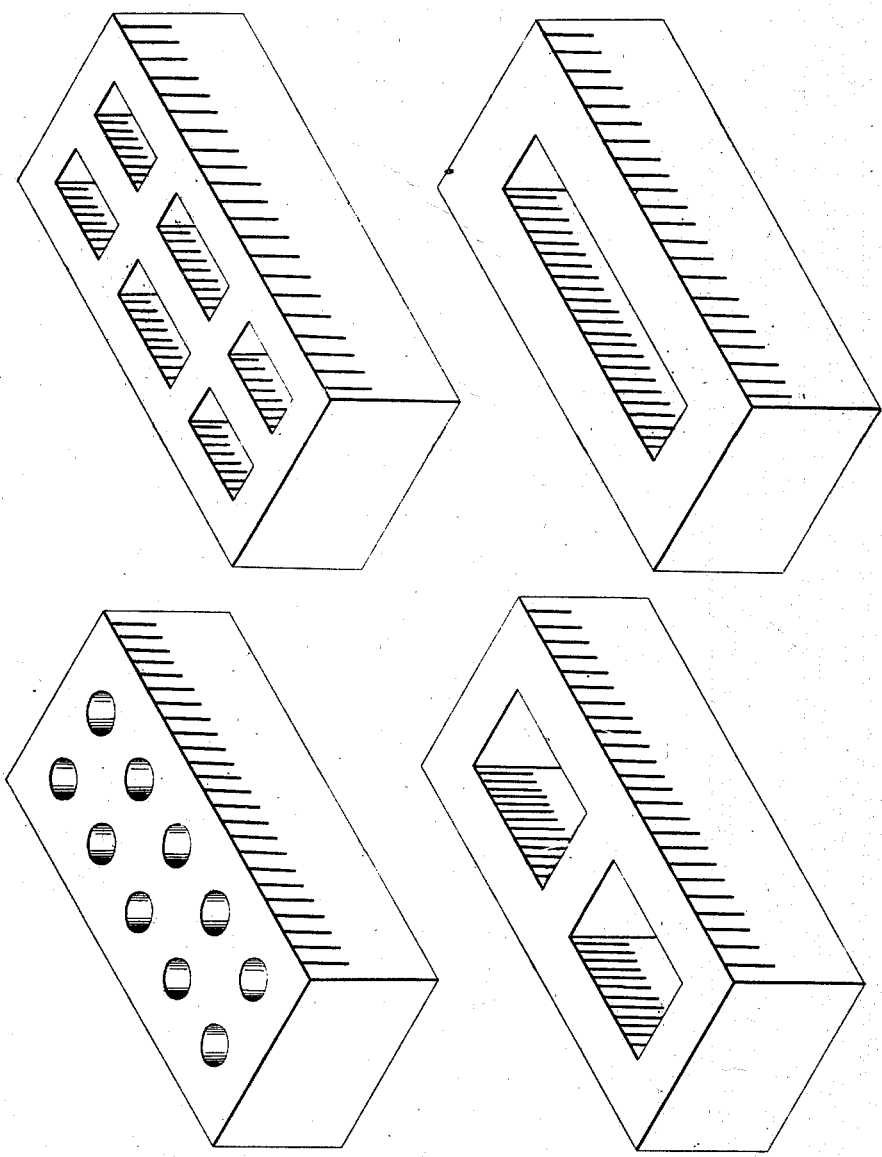

AMBROSE FOSTER, OF PORTLAND, WISCONSIN; E. A. MESSINGER AND WM. A. SPENCER, ADMINISTRATORS OF JOHN A. MESSINGER, DECEASED, LATE OF MILWAUKEE, WISCONSIN.

BUILDING-BLOCK.

Specification of Letters Patent No. 12,264, dated January 16, 1855.

*To all whom it may concern:*

Be it known that AMBROSE FOSTER, of Portland, in the county of Dodge, and JOHN A. MESSINGER, deceased, late of Milwaukee, in the county of Milwaukee, both in the State of Wisconsin, have invented a new and useful Building-Block as a Substitute for Bricks and Stones, of which the following is a full, clear, and exact description, reference being had to the accompanying drawings, which represent building-blocks of various forms made according to this improved plan.

The bases of this improved building block are lime and sand, articles which are old and well known materials for building purposes, and have been used in combination in a great variety of relative proportions, under innumerable forms, either as mortar to cement stones or bricks together, as concrete to make foundations, or as molded and dried blocks of mortar; but this invention is clearly distinguishable from all these and other things before known, for although it is composed of such old and well known materials, yet these materials are so combined as to give to the block new properties and advantages essentially different from those possessed by any other known artificial building material. The manner in which these new building blocks are formed is as follows:—A quantity of coarse siliceous sand, as free as possible from admixture with clay or other earths is provided, together with a quantity of good freshly slaked lime in powder. Each of these should be sifted to separate any coarse lumps it may contain. As much sand and lime as can be molded into blocks during an hour, are then to be thoroughly mixed together, in the proportions of about one part, by measure, of lime, to twelve parts of sand, the lime being the dry powdery hydrate produced when lumps of calcined limestone are freshly slaked, and the sand being as damp, as it ordinarily is when dug out of the earth. This composition is next placed in molds of the proper shape, in a molding press, similar to those in common use for making bricks from pulverulent clay, and is there submitted to great pressure which should be proportioned to the thickness of the block required. A suitable pressure for a block which, when finished would be ten inches long, four inches wide, and three inches thick, would be one hundred and twenty tons, or three tons to the inch. Thinner blocks would of course require less, and thicker more pressure than this. When the block has been thus submitted to pressure, it is removed from the mold with care, and laid upon a flat surface with free access of air, where it should remain until sufficiently hardened or ripened to be built into a wall, which will be from four to twenty days, according to the thickness of the block, and the state of the weather. For the purpose of facilitating the ripening of the block, it should, where this form is admissable, be perforated with one or more holes, as represented in the drawings. These admit the carbonic acid of the atmosphere into the central part of the blocks, and thus convert the hydrate of lime into carbonate, which change, if the blocks were large and solid, might not take place for years. The particles of sand in the composition are forced by the heavy pressure to which the block is subjected, into such close proximity that it requires but very little cement to fill the interstices, and agglomerate them together into a block of compact sandstone. Hence a small proportion of lime furnishes an abundance of cement. The blocks thus made become indurated after a few months to such a degree, that they are not readily distinguishable from natural sandstone such as is used in many places for building purposes; and perhaps the most appropriate name for this building block would be artificial stone. Care must be taken in the preparation of this material, not to employ wet sand, because if there is an excess of moisture to such a degree that water exudes while the block is pressing, or mortar is formed, it would be impossible to give to the mass, the requisite solidity, as the cohesion of the water to the sand and lime is so strong and its incompressibility is so great that it could not be expressed in the very brief space of time to which the pressure of the block in the process of manufacture is necessarily limited. This excess of water would afterwards be evaporated leaving the block, comparatively, porous, light, and friable, and it would not maintain its shape, would crack in drying, would be much longer in hardening, and would never attain that degree of induration necessary to constitute it a good building material; these are the objections to the blocks of mortar before referred to.

If the lime should be of poor quality such as is made in some sections of the country from a siliceous magnesian limestone, it might require one bushel of lime to six of sand. Again, if sharp, washed, sand is of very coarse grain, it will require more lime than if of fine grain; if it is loamy and fine, it will require more or less lime according to the nature of its impurities.

When sand is not readily obtainable, the coarsely pulverized scoria of furnaces, bricks, &c., and other pulverulent siliceous matter may be employed in place of the sand.

The lime and sand may be mixed with the oxids of metals or other coloring matter, to give the blocks any desired color.

These blocks dry without shrinking or warping, and hence, possess in these particulars, great advantages over bricks, which always shrink much, and very unequally, and also warp in burning.

Ornamental devices too, may be molded upon these blocks, which could not be formed upon any kind of a brick or block, that required burning, without increasing the expense beyond what would be justified by the value of the brick, when finished.

As sand and lime, can be obtained cheaply in nearly all sections of the country where buildings are required, and no expense for burning, or making, filling, and emptying kilns is necessary in the manufacture of these blocks, as in brick making, they will in most places cost less than bricks and will supply a good and cheap building material, which has long been a great desideratum.

The building block herein described, is claimed as a new manufacture.

AMBROSE FOSTER.
ELIZABETH A. MESSINGER,
WILLIAM A. SPENCER,
*Administrators of the estate of John A. Messinger, deceased.*

Witnesses:
E. L. PHELPS,
E. M. JOSLIN.